(12) United States Patent
Huang et al.

(10) Patent No.: US 6,389,015 B1
(45) Date of Patent: May 14, 2002

(54) METHOD OF AND SYSTEM FOR MANAGING A SONET RING

(75) Inventors: Jennifer Huang, Richardson; Anis Khalil; Sridhar Nathan, both of Plano, all of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/131,538

(22) Filed: Aug. 10, 1998

(51) Int. Cl.⁷ .......................... H04L 12/43; H04L 12/50
(52) U.S. Cl. .................. 370/376; 370/458; 370/459; 370/222
(58) Field of Search .............................. 370/258, 280, 370/294, 314, 375, 376, 404, 235, 230, 458, 459, 452

(56) References Cited

U.S. PATENT DOCUMENTS 6,118,792 A * 9/2000 Beshai ........................ 370/468
6,192,049 B1 * 2/2001 Sohraby ...................... 370/389

* cited by examiner

*Primary Examiner*—Wellington Chin
*Assistant Examiner*—Brenda H. Pham

(57) ABSTRACT

A method of and system for managing a SONET ring computes an optimally balanced demand loading for the SONET ring and generates an updated time slot assignment map for each node of the SONET ring based upon the optimally balanced demand loading. The method causes each node of the SONET ring to switch substantially simultaneously to its updated time slot assignment map, thereby reconfiguring the SONET ring.

20 Claims, 12 Drawing Sheets

| INDEX | NODES | DEMAND | LINKS |
|---|---|---|---|
| 1 | 1,2 | 5 | |
| 2 | 1,3 | 4 | |
| 3 | 1,4 | 3 | |
| 4 | 1,5 | 5 | |
| 5 | 1,6 | 3 | |
| 6 | 2,3 | 4 | |
| 7 | 2,4 | 5 | |
| 8 | 2,5 | 4 | |
| 9 | 2,6 | 4 | |
| 10 | 3,4 | 4 | |
| 11 | 3,5 | 4 | |
| 12 | 3,6 | 5 | |
| 13 | 4,5 | 3 | |
| 14 | 4,6 | 4 | |
| 15 | 5,6 | 3 | |

FIG. 12

| INDEX /85 | TWO-EDGE CUT($e_k,e_l$) /87 | $C(e_k)+C(e_l)$ /89 | $D(e_k,e_l)$ /91 | CUT_DIFF($e_k,e_l$) /93 | FLAG |
| --- | --- | --- | --- | --- | --- |
| 1 | 1,2 | 38 | 22 | 16 | 0 |
| 2 | 1,3 | 38 | 35 | 3 | 0 |
| 3 | 1,4 | 38 | 36 | 2 | 0 |
| 4 | 1,5 | 38 | 33 | 5 | 0 |
| 5 | 1,6 | 38 | 20 | 18 | 0 |
| 6 | 2,3 | 38 | 21 | 17 | 0 |
| 7 | 2,4 | 38 | 32 | 6 | 0 |
| 8 | 2,5 | 38 | 37 | 1 | 0 |
| 9 | 2,6 | 38 | 32 | 6 | 0 |
| 10 | 3,4 | 38 | 19 | 19 | 0 |
| 11 | 3,5 | 38 | 32 | 6 | 0 |
| 12 | 3,6 | 38 | 37 | 1 | 0 |
| 13 | 4,5 | 38 | 19 | 19 | 0 |
| 14 | 4,6 | 38 | 32 | 6 | 0 |
| 15 | 5,6 | 38 | 19 | 19 | 0 |

FIG. 13

METHOD OF AND SYSTEM FOR MANAGING A SONET RING

CROSS-REFERENCE TO RELATED APPLICATION

The present application is related to application Ser. No. 09/036,392, filed Mar. 6, 1998, titled Method of Optimal Routing in a Bi-Directional Line Switched SONET Ring, assigned to the assignee of the present Application.

FIELD OF THE INVENTION

The present invention relates generally to communication network management, and more particularly to a method of and a system for reconfiguring a SONET ring to maintain optimally balanced demand loading.

DESCRIPTION OF THE PRIOR ART

Traditionally, network design, network provisioning and management, and network migration are treated as separate tasks that are often done by different organizations within a carrier. The mandate of the network design task is to optimize the routing and resource allocation in order to obtain a minimum cost network. Network design tends to take a long term view by considering the forecast of traffic at the end of a target. The resulting network design has a potential danger of being far from reality or impossible to implement.

The network migration planning task is based upon available yearly or quarterly capital budget and decisions tend to focus only on a short-term effects to the network, without considering the overall consequences and the life cycle of the network.

The network provisioning and management task concentrates on meeting day-to-day circuit provisioning requirements and it tends to use simple rules. More often than not, the decision how circuits are provisioned is based on individual discretion. The effect of a decision to provision circuits and the overall consequences to network utilization are normally not considered or understood in day-to-day operations.

Consequently, there is a gap between an optimized network design and the actual implementation of the network. This gap results largely because optimized network designs are based on global knowledge of traffic demands and specific ways of routing and bundling those demands for minimizing the total cost of the network. In the actual realization of the network, the demands may turn out to be very different from the original forecasts, and the lack of automation and selecting routes for provisioning circuit demands results in inefficient utilization of network capacities. Thus, given the same traffic volume, the actual realized cost of the network is usually significantly higher than the original estimate.

As the network evolves, new capacities and new fiber routes are added to the network. At the same time, new requirements on the transmission network come from traffic volume growth and new types of services that have different bandwidths. Quality of service and routing constraints also change the network dynamics.

Typically, because of difficulties in reconfiguring the network, trunk groups that were misrouted due to lack of capacity at the time of provisioning are not re-routed even when new capacities become available at a later time. Over the course of network evolution, the result is often a disorderly set of traffic routes. Comparing the actual traffic routing pattern against the optimal routing, it is usually found that by reconfiguring the network routing, then plenty of capacity can be squeezed out of the network. By reconfiguring the network, overall utilization will be increased and there may not be a need for adding new capacities to the network. Accordingly, the life cycle cost of the network can be reduced greatly.

Under a mesh architecture, several ways of reconfiguring a network have been proposed. These include AT&T's "Fully Shared Network" concept and TRLab's "Self-Engineered Network" concept. However, when reconfiguring the whole network, the requirement on synchronization and switching time is quite high and current digital cross connect (DXC) and switch technology essentially do not have the capability to support a real time network wide configuration. The estimated risk and cost of reconfiguration of a transmission network under the mesh architecture is prohibitively high for any carrier to consider this option seriously. Another concern that prohibits reconfiguration in a mesh architecture is that when factoring restoration into the overall configuration scheme, complexities make network reconfiguring virtually impossible. Therefore, though transmission network reconfigurations have been proposed by various research organizations in the past, no one has actually implemented a proposed system.

Recently, there has been a move away from mesh topology for telecommunications networks toward a ring topology. In a bidirectional line switched ring, the demands on the ring are allowed to be routed on either side of the ring, and capacity for all spans of the ring is required to be the same. A ring topology offers advantages over a mesh topology, primarily in that a ring is self-healing and therefore may be restored in a matter of milliseconds after a failure. However, rings are still subject to becoming poorly routed over the course of ring evolution. As ring demands are provisioned and de-provisioned, certain spans of the ring become congested while other spans become under utilized. It is therefore an object of the present invention to provide a management system that reconfigures a ring in real time.

SUMMARY OF THE INVENTION

The present invention provides a method of and system for managing a SONET ring. The method of the present invention computes an optimally balanced demand loading for the SONET ring and generates an updated time slot assignment map for each node of the SONET ring based upon the optimally balanced demand loading. The method causes each node of the SONET ring to switch substantially simultaneously to its updated time slot assignment map, thereby reconfiguring the SONET ring.

The method computes an optimally balanced demand loading for the SONET ring by computing a demand loading for the SONET ring such that each link of said SONET ring carries substantially the same demand as every other link of said SONET ring. The method causes each node of the SONET ring to switch substantially simultaneously to its updated time slot assignment map by downloading to each node of said SONET ring its updated time slot assignment map along with a designated time to make the substitution. The method freezes provisioning activity on the SONET ring while reconfiguring the SONET ring.

The present invention also provides a method of reconfiguring inter-ring routing by moving circuits from one inter-ring path to another. The method sets up digital cross connect connection for the new path and then downloads to each ring of the network new time slot assignment maps based upon the new path. The method then causes the rings of the new path to switch to the new time slot assignment maps.

BRIEF DESCRIPTION OF THE DRAWINGS

FIG. 12 is a pictorial representation of a demand array according to the present invention.

FIG. 13 is a pictorial representation of a two-edge cut array according to the present invention.

DESCRIPTION OF THE PREFERRED EMBODIMENT

Figure 1:
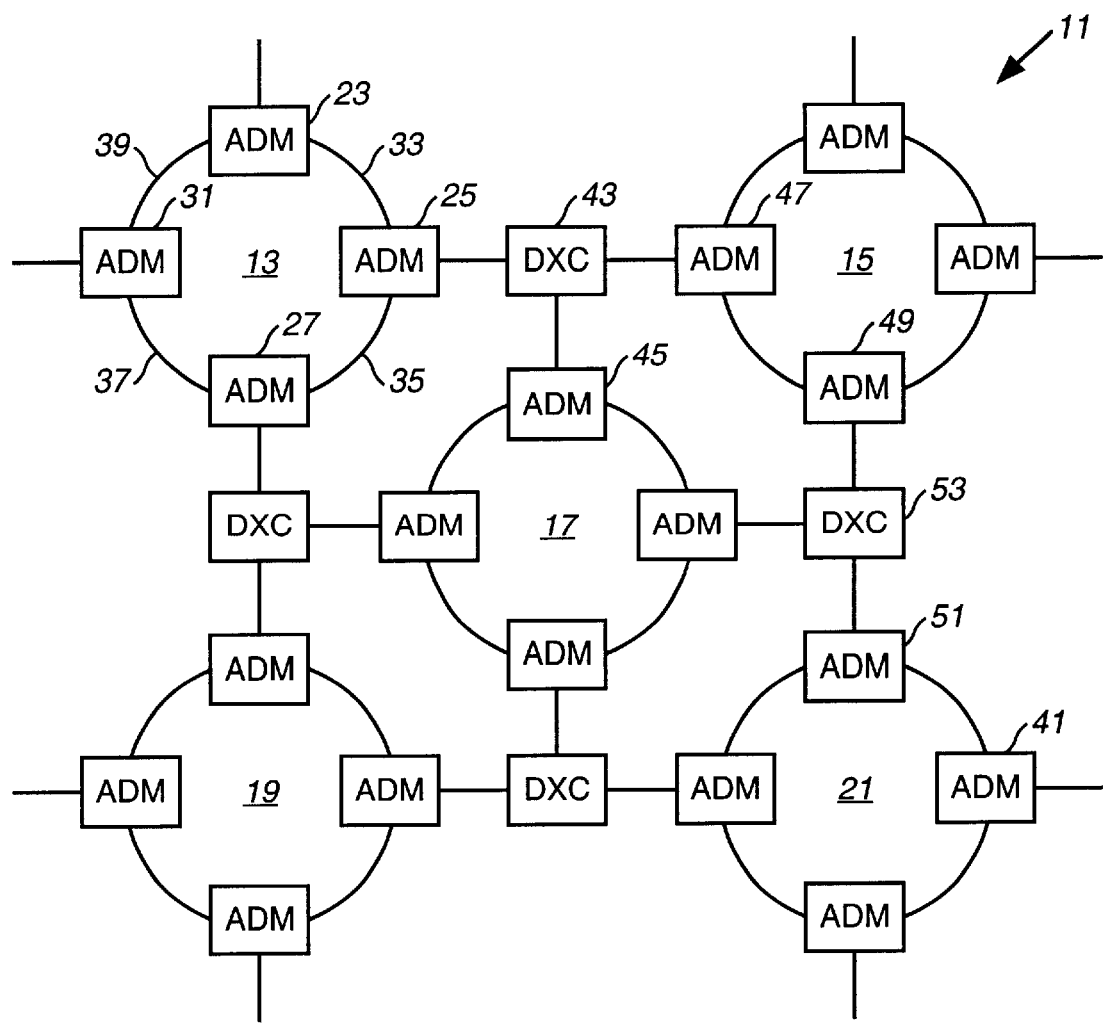
FIG. 1 is block diagram representation of a portion of a network of interconnected rings.

Referring now to the drawings, and first to FIG. 1, a portion of a network is designated generally by the numeral 11. Portion 11 includes five bi-directional line switched SONET rings, 13–21. In the illustrated example of FIG. 1, each ring includes four nodes and four links. For example, ring 13 includes nodes that comprise add/drop multiplexors (ADM) 23–31 that are inner-connected by links 33–39. Although each ring of 13–21 of portion 11 includes four nodes, those skilled in the art will recognize that FIG. 1 is for purposes of illustration and that a bi-directional line switched SONET ring may contain any number of nodes up to about sixteen.

As is well known to those skilled in the art, ADMs 23–31 add and drop circuits to and from ring 13 according a time slot assignment (TSA) map. A TSA map is associated with each ADM 23–31. The TSA map specifies, for each time slot, whether traffic is to be added/dropped at a particular ADM.

Network portion 11 of FIG. 1 provides for both intra-ring and inter-ring routing. In intra-ring routing, demands originate and terminate at nodes of same ring. For example, a demand between subscribers associated with ADM's 23 and 31 may be carried clockwise or counter-clockwise around ring 13. In the case of inter-ring routing, demands between subscribers associated with different rings are carried. For example, a demand between a subscriber associated with ADM 23 of ring 13 and a subscriber associated with ADM 41 of ring 21 may be carried on any of several paths through the network. Such a demand may be carried between ring 13 and ring 21 through any one of rings 15–19. For example, a demand may be added to ring 13 at ADM 23 and dropped at ADM 25. A DXC 43 is provided to selectively connect the demand dropped at ADM 25 to either an ADM 45 of ring 17 or an ADM 47 of ring 15. If the demand is added to ring 15 at ADM 47, then the demand is dropped from ring 15 at ADM 49. The demand dropped at ADM 49 is added to ring 21 at ADM 51 through a DXC 53. The DXCs allow the inter-ring routing to be reconfigured in order to balance the ring loading across the network.

It is desirable that each link of a ring carry substantially the same demand. At the time a ring is designed, the demand loading is typically balanced. However, as circuits on the ring are provisioned and deprovisioned, the demand loading typically becomes unbalanced. The unbalanced loading leads to bottle necks.

Figure 2:
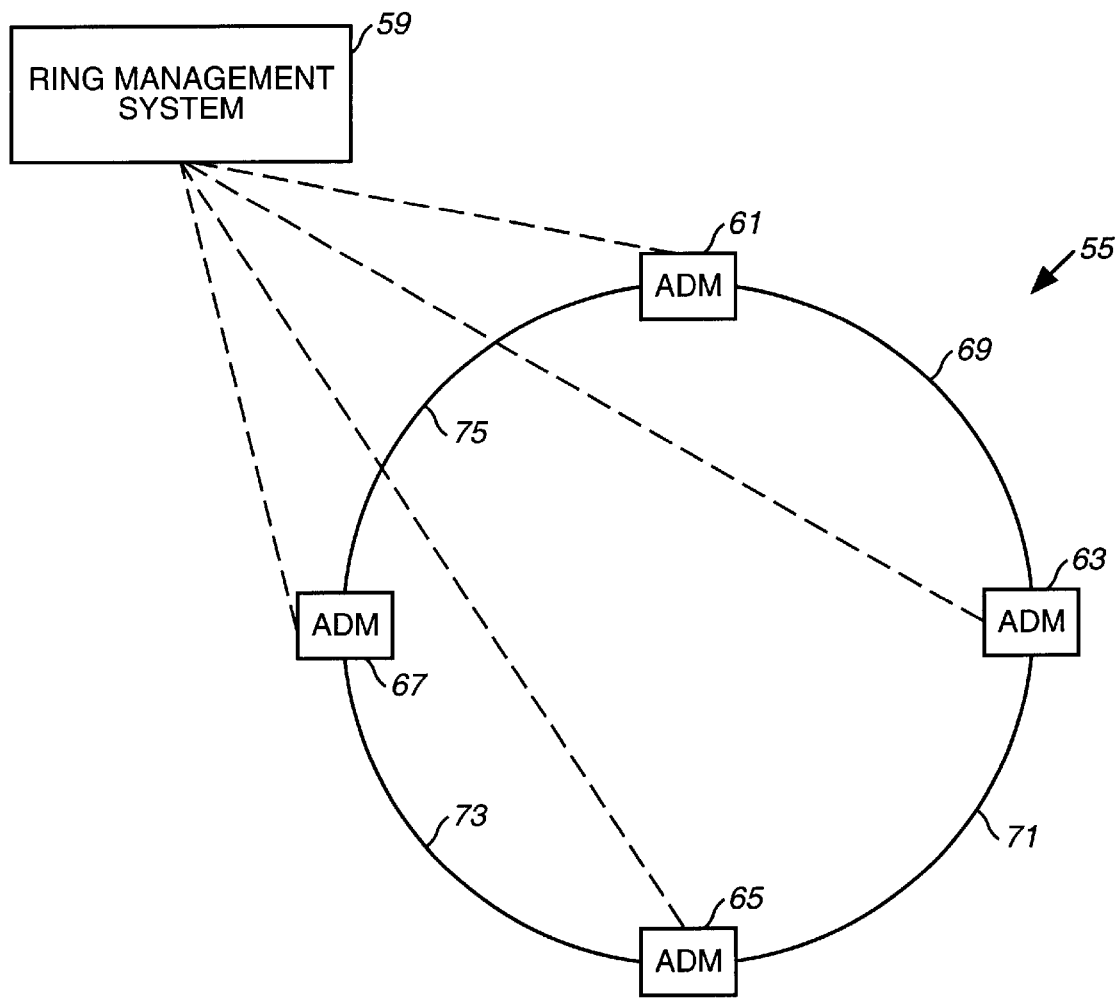
FIG. 2 is a block diagram of a ring and ring management system according to the present invention.

According the present invention, the demand loading of each ring of a network is periodically rebalanced. Rebalancing according to the present invention removes bottle necks in the network and has the effect of squeezing additional capacity out of each ring. Referring to FIG. 2, there is shown a system according to the present invention, which is designated generally by numeral 55. System 55 includes a ring 57 and a network management system 59. Ring 57 includes four ADMs 61–67 inter-connected by links 69–75. Ring 57 is preferably a bi-directional line switched SONET ring. Ring management system 59 includes a computer programmed according to the method of the present invention. Ring management system 59 communicates with each ADM 61–67 through suitable communication links indicated by dashed lines in FIG. 2.

In the manner known to those skilled in the art, traffic is routed around ring 57 according to working time slot assignment maps at each ADM 61–67. As circuits are provisioned and de-provisioned in ring 57, the time slot assignment maps are modified on a per circuit basis. According to the present invention, ring management system 59 periodically calculates an optimally balanced demand loading for ring 57 and generates for each ADM 61–67 a secondary time slot allocation map based on the optimally balanced demand loading. Ring management system 59 then downloads to each ADM 61–67 the appropriate time slot assignment map along with an instruction to swap the secondary time slot allocation map for the working time slot allocation map. Each ADM 61–67 substantially simultaneously flash cuts from the working time slot assignment map to the secondary time slot assignment map, thereby making the secondary time slot assignment map the new working time slot assignment map. The flash cut operation occurs in about fifty milliseconds so that the load balancing reconfiguration does not affect or disrupt traffic on ring 57.

The operation of the preferred embodiment of the system of the present invention may be best understood with reference to FIGS. 3–14.

Figure 3:
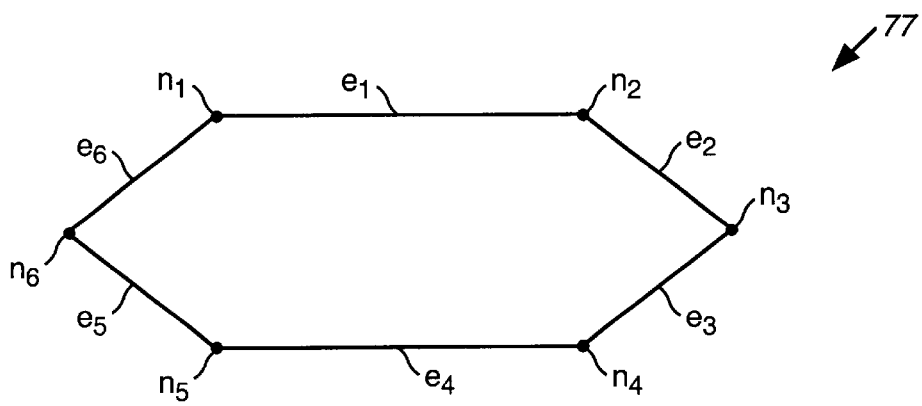
FIG. 3 is a pictorial representation of an optical ring.

Referring now to FIG. 3, a ring is designated generally by the numeral 77. Ring 77 includes six nodes $n_1$–$n_6$ and six links or edges $e_1$–$e_6$. Those skilled in the art will recognize that the six node and link ring of FIG. 3 is for purposes of illustration and that optical rings can include any number of nodes up to about sixteen.

Figure 10:
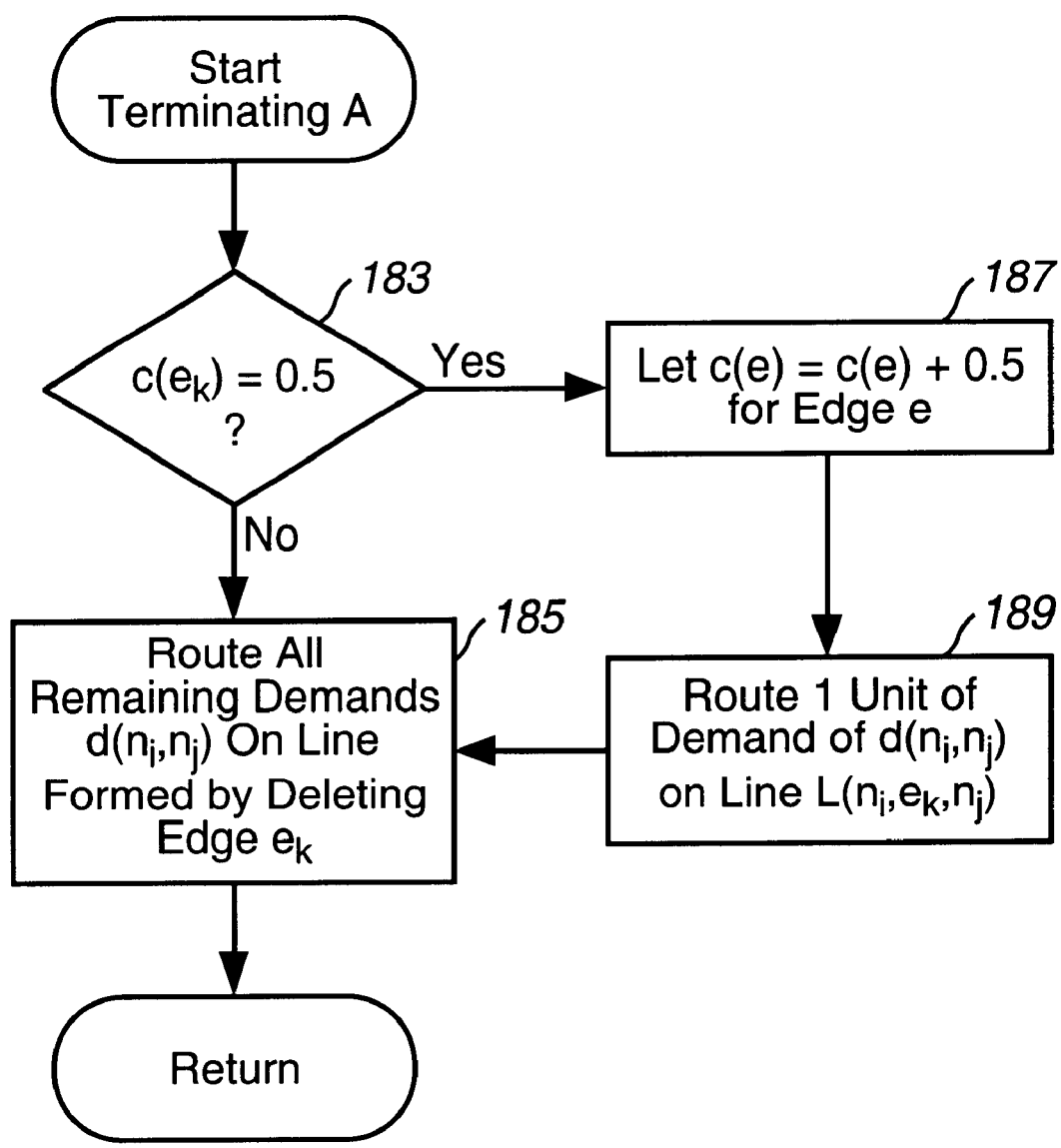
FIG. 10 is a flowchart of the terminating step A of FIG. 6.

Between each pair of nodes of ring 77 there is a demand. Referring briefly to FIG. 12, there is shown a demand array according to the present invention for ring 77. The demand array of FIG. 12 includes a nodes column 79 and demand column 81. For the sake of clarity, the nodes of column 79 of the demand array of FIG. 10 are referred to by their subscripts.

The demand between nodes $n_1$–$n_6$ is carried bi-directionally around ring 77 through link $e_1$–$e_6$. For example, the three units of demand between nodes $n_1$ and $n_4$ may be carried clockwise through links $e_1$–$e_3$ or counter-clockwise through link $e_4$–$e_6$. Additionally, one unit of the three units of demand can be carried in one direction and the other two units can be carried in the other direction.

As will be apparent to those skilled in the art, it is not easy to determine the minimum capacity of each link e necessary to route all of the demands or to assign the flow in a ring. The preferred demand load balancing process of the present invention includes two parts. The first part calculates the capacity requirements for satisfying all the demands on the ring. The second part routes demands based upon the capacity generated from the first part.

Figure 14:
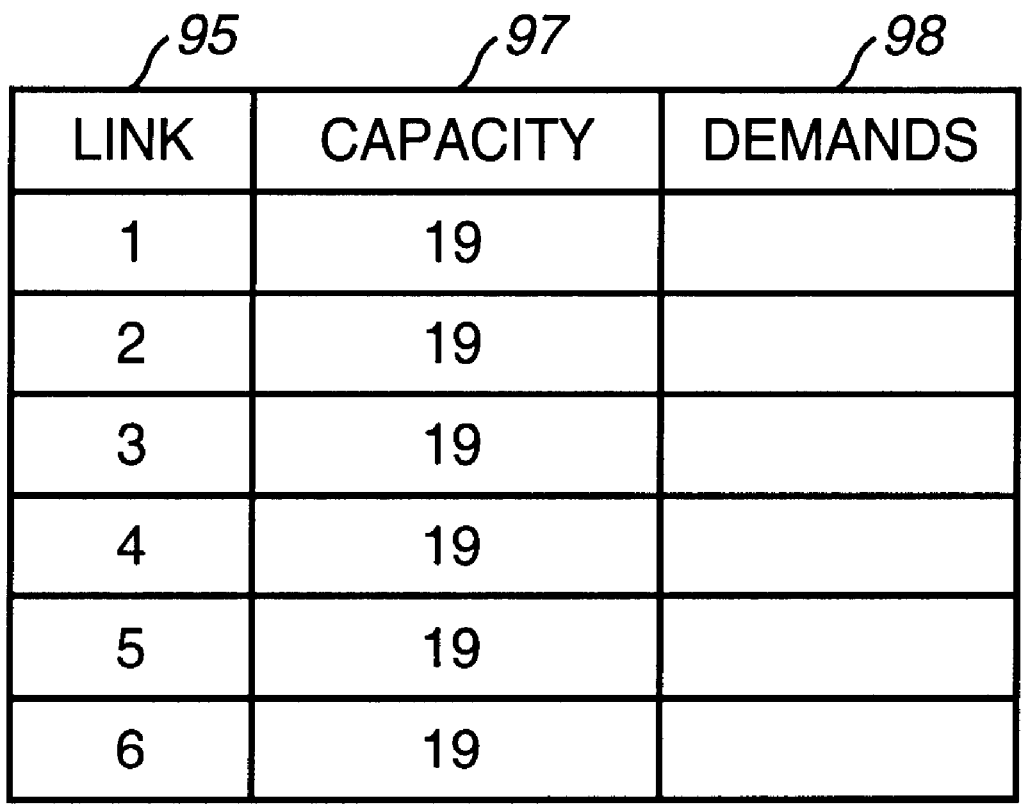
FIG. 14 is a pictorial representation of a capacity array according to the present invention.

The method of the present invention is preferably computer implemented. The data structures utilized in the computer implementation include the demand array of FIG. 12, a two-edge cut array as illustrated in FIG. 13, and a capacity array as illustrated in FIG. 14.

Referring to FIG. 12, the demand array includes, in addition to node column 79 and demand column 81, a links column 83, which contains a linked list of links that is generated according to the present invention. Referring to FIG. 13, the two-edge cut array includes a two-edge cut column 85 that contains each pair of links of the ring. A two-edge cut is an analytical tool that divides the ring under consideration into two parts. For example, two-edge cut (1,4) is a cut of links $e_1$ and $e_4$, which divides the nodes of ring 11 into a first subset consisting of nodes $n_2$–$n_4$, and a second subset consisting of nodes $n_5$, $n_6$, and $n_1$. An adjacent two-edge cut cuts adjacent links and divides the ring into a first set of nodes consisting of a single node and a second subset consisting of the rest of the nodes. Thus, two-edge cuts (1, 2), (1, 6), (2, 3), (3, 4), (4, 5) and (5, 6) are adjacent two-edge cuts.

The two-edge cut array of FIG. 13 also includes a capacity column 87, which contains the available capacity of the links of each two-edge cut ($e_k$, $e_l$). Capacity column 87 is initially set to zero and it is populated with results of the capacity assignment process of the present invention. The values in capacity column 87 are manipulated during the flow routing process of the present invention.

The two-edge cut array of FIG. 13 includes a two-edge cut demand column 89. Demand column 89 contains for each two-edge cut ($e_k$, $e_l$) a demand D($e_k$, $e_l$) that is the demand between the sets of nodes formed by each two-edge cut ($e_k$, $e_l$). Demand column 89 is initially set to zero. The values in demand column 89 are computed in the capacity assignment process of the present invention and recomputed during the flow routing process of the present invention.

The two-edge cut array of FIG. 13 also includes a cut difference column 91. Cut difference column 25 includes a cut_diff($e_k$, $e_l$) value for each two-edge cut ($e_k$, $e_l$). The values of cut difference column 91 are calculated during flow routing processing according to the invention and cut difference column 91 contains the difference between the values of capacity column 87 and demand column 89 for each two-edge cut ($e_k$, $e_l$). According to the present invention, a value in cut difference column 91 can never be less than zero.

The two-edge cut array of FIG. 13 also includes a flag column 93. The values in flag column 93 are initially set to zero. As will be explained in detail hereinafter, a flag is set to one whenever a two-edge cut ($e_k$, $e_l$) is processed during a processing step A of flow routing processing of the present invention.

Referring now to FIG. 14, a capacity array includes a link column 95 and a capacity column 97. Capacity column 97 contains the available capacity of each link $e_k$ of the ring. Capacity column 97 is populated during capacity processing according to the present invention. The values of capacity column 97 are updated during flow routing according to the present invention.

Figure 4:
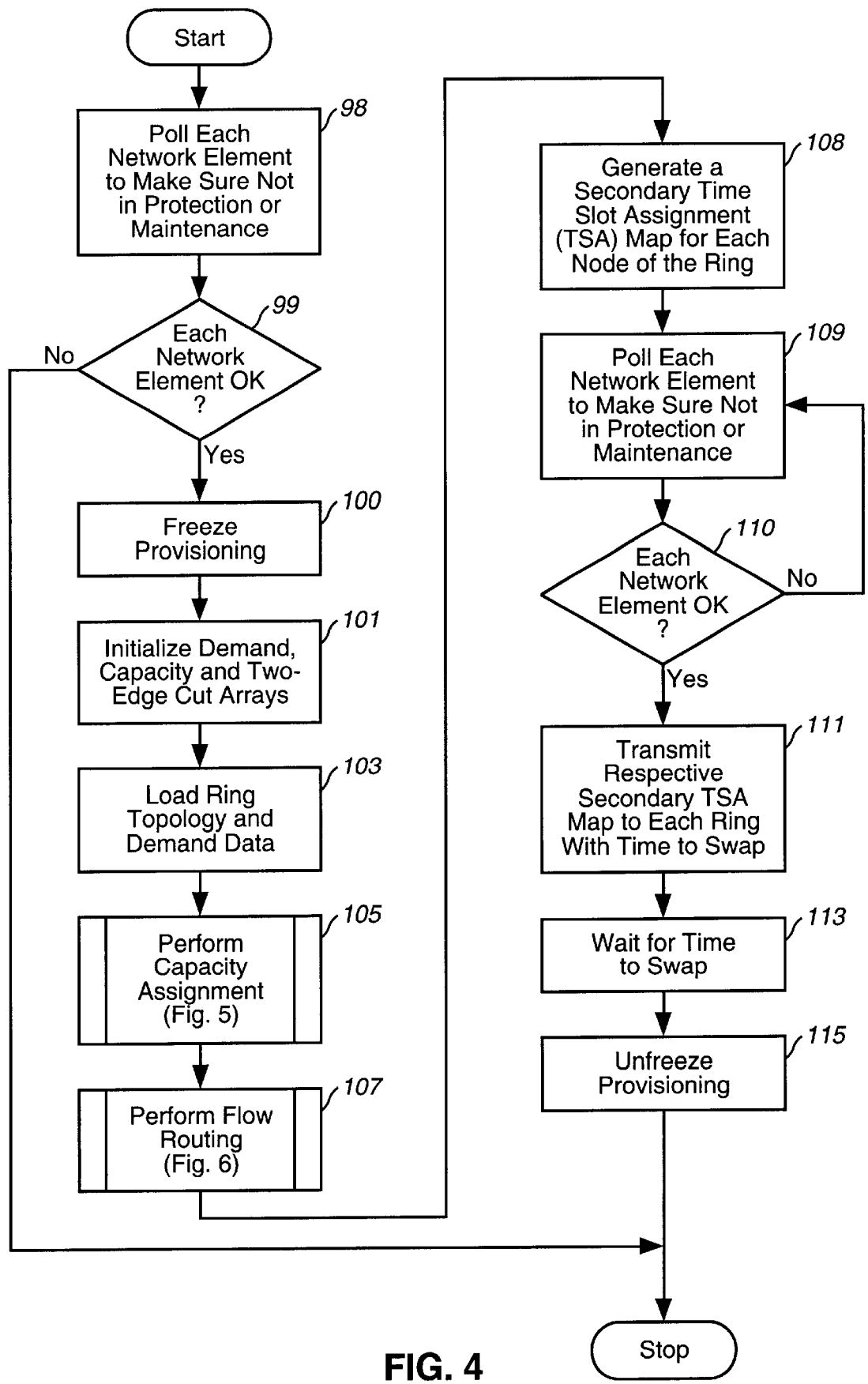
FIG. 4 is a high level flowchart of the method of the present invention.

Referring now to FIG. 4, there is shown a high level flow chart of ring management system processing according to the present invention. The network management system first poll the network elements, at block 98, to make sure that none of the elements is in maintenance or protection mode. If, at decision block 99, each network element is not in a good state, then processing ends. If each network element is OK, then the ring management system freezes provisioning activity, at block 100, to ensure that the demands carried by the ring are stable during reconfiguration. Then, the demand, capacity, and two-edge cut arrays are initialized at block 101 and the ring topology and demand data are loaded at block 103. The demand data is loaded into demand column 81 of FIG. 12. After the ring topology and demand data are loaded, the method of the present invention performs capacity assignment processing, as indicated generally at block 105 and shown in detail with respect to FIG. 5. Then, the method of the present invention performs flow routing, as indicated generally at block 107, and shown in detail with respect to FIG. 6.

After performing flow routing at block 107, the ring management system of the present invention generates a secondary time slot assignment map for each node of the ring, at block 108. The secondary time slot assignment map is generated from the result of flow routing processing at block 107. Then, the ring management system again polls each network element to make sure none of the elements are in maintenance or protection mode, at block 109. If, at decision block 110, each network element is OK, then the ring management system transmits the respective secondary time slot assignment map to each node with a time to swap the secondary time slot assignment map for the working time slot assignment map of the node, at block 111. Then, the ring management system waits for the time to swap, at block 113, and unfreezes provisioning activity, at block 115.

Figure 5:
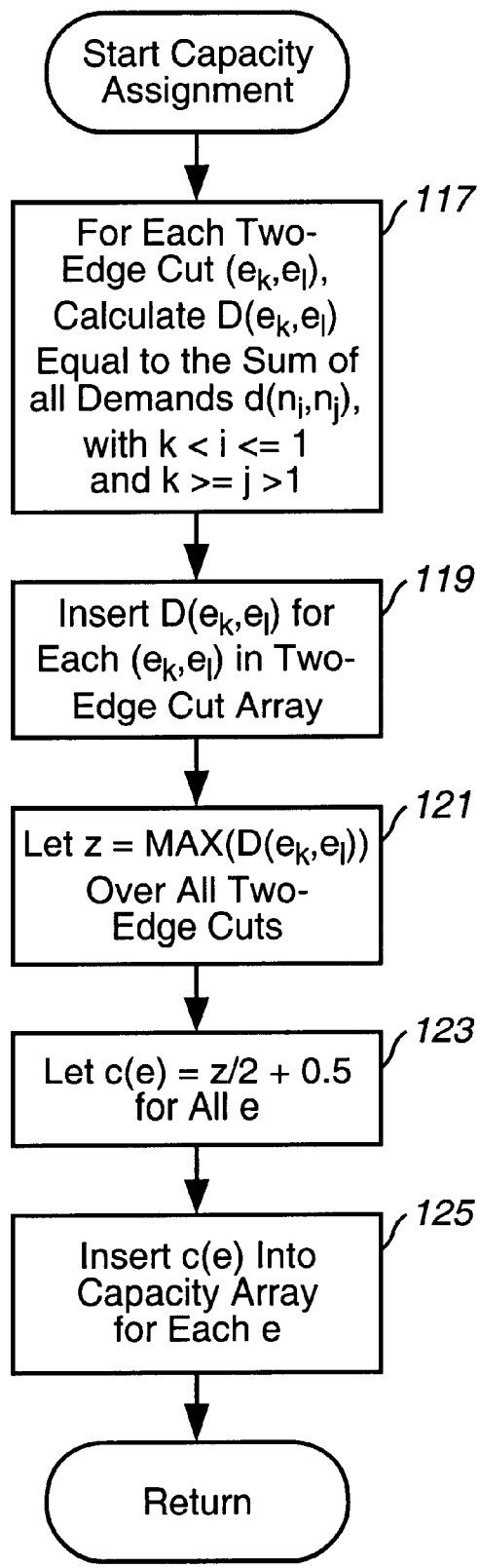
FIG. 5 is a flowchart of a capacity assignment process of the present invention.

Referring now to FIG. 5, the capacity assignment method of the present invention calculates, for each two-edge cut ($e_k$, $e_l$), a demand D($e_k$, $e_l$), at block 117. Demand D($e_k$, $e_l$) is equal to the sum of all demands between the subsets of nodes on either side of two-edge cut ($e_k$, $e_l$). It will be recalled that a two-edge cut divides the ring into two subsets of nodes. A first set of nodes X is the set of nodes between links $e_k$ and $e_l$. The second subset of nodes (N–X) is the set of nodes between links $e_l$ and $e_k$. For example, two-edge cut ($e_1$, $e_4$) divides the nodes of ring 11 into a subset X consisting of nodes $n_1$, $n_3$, and $n_4$, and a second subset (N–X) consisting nodes $n_1$, $n_5$, and $n_6$. Demand D($e_1$, $e_4$) is equal to the sum of all demands between nodes $n_2$–$n_4$ and nodes $n_5$–$n_1$, which in the illustrated example is equal to thirty-six demand units. Computationally, the capacity assignment process of the present invention calculates the demand D($e_k$, $e_l$) as the sum of all demands D($n_i$, $n_j$) wherein i is greater than k and equal to or less than l and wherein j is greater than l and equal to or less than k.

As the capacity assignment method of the present invention calculates demands D($e_k$, $e_l$), the capacity assignment method of the present invention inserts a demand D($e_k$, $e_l$) for each two-edge cut ($e_k$, $e_l$) into the two-edge cut array of FIG. 13, at block 119. Referring to FIG. 13, the demand values are inserted into demand column 89. Then, the capacity assignment process of the present invention lets z equal the maximum demand D($e_k$, $e_l$) over all two-edge cuts, at block 121. Referring to FIG. 13, the demands $D(e_k, e_l)$ have been computed and inserted into demand column 89. It will be noted that the maximum demand is thirty-seven demand units, which is the demand for two-edge cuts $(e_2, e_5)$ and $(e_3, e_6)$. Referring again to FIG. 5, the capacity assignment process of the present invention lets the capacity c(e) equal to z divided by two, plus 0.5 capacity units, for all edges e of the ring, at block 123. Since the maximum two-edge cut demand is thirty-seven, z is equal to 18.5 capacity units. Accordingly, the capacity for each edge $e_k$ is set to nineteen capacity units and that value is inserted into the capacity column 97 of capacity array of FIG. 14 for each link, at block 125.

Figure 6:
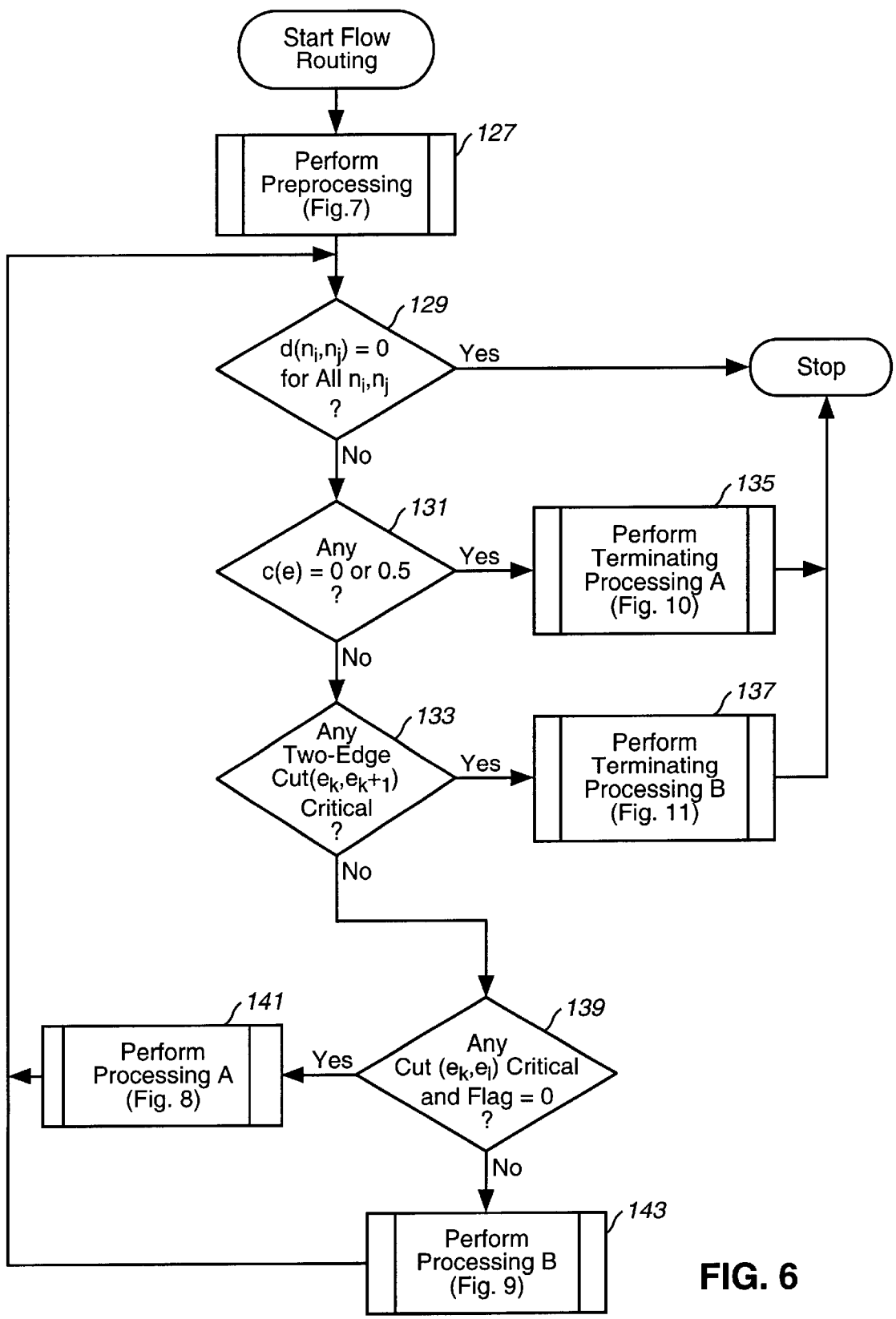
FIG. 6 is a high level flowchart of the flow routing process of the present invention.

Referring now to FIG. 6, there is shown a high level flow chart of flow routing processing according to the present invention. The flow routing process of the present invention performs preprocessing, as indicated generally at block 127, and shown in detail with respect to FIG. 7. Then, the flow routing process of the present invention checks for three terminating conditions at decision blocks 129–133. At decision block 129, the flow routing process of the present invention tests whether or not the demand $D(n_i, n_j)$ is equal to zero for all node pairs $(n_i, n_j)$. If each value in demand column 81 of FIG. 12 is equal to zero, then there are no more demands to route and the process is finished. If, at decision block 129, not all demands $D(n_i, n_j)$ are equal to zero, then the flow routing process of the present invention tests, at decision block 131 if any capacity c(e) is equal to zero or 0.5. The test of decision block 131 is processed with respect to the capacity array of FIG. 14. If any value in capacity column 97 is equal to zero or 0.5, processing proceeds to a terminating processing step A, as indicated generally at block 135, and shown in detail with respect to FIG. 10.

The flow routing process of the present invention tests for the third terminating condition at decision block 133, by determining whether any adjacent two-edge cut $(e_k, e_{k+1})$ is critical. As will be explained in detail hereinafter, a critical cut is a two-edge cut for which the cut difference is equal to zero or one. A critical adjacent two-edge cut indicates that all commodities remaining have the same origin and the flow routing problem effectively becomes a single commodity problem. If, at decision block 133, an adjacent two-edge cut is critical, then the system performs a terminating process step B, as indicated generally at block 137, and shown in detail with respect to FIG. 11.

If, at decision block 133, it is determined that there are no terminating conditions, then the flow routing method of the present invention tests, at decision block 139, if any two-edge cut $(e_k, e_l)$ is critical and its flag is set to zero. A two-edge cut $(e_k, e_l)$ is a critical cut if the cut difference cut_diff $(e_k, e_l)$ is equal to zero or one. Referring to FIG. 13, it will be observed that two-edge cuts $(e_2, e_5)$ and $(e_3, e_6)$ are critical cuts. It will also be observed that in FIG. 13, the flag for those two-edge cuts is set to zero.

Figure 7:
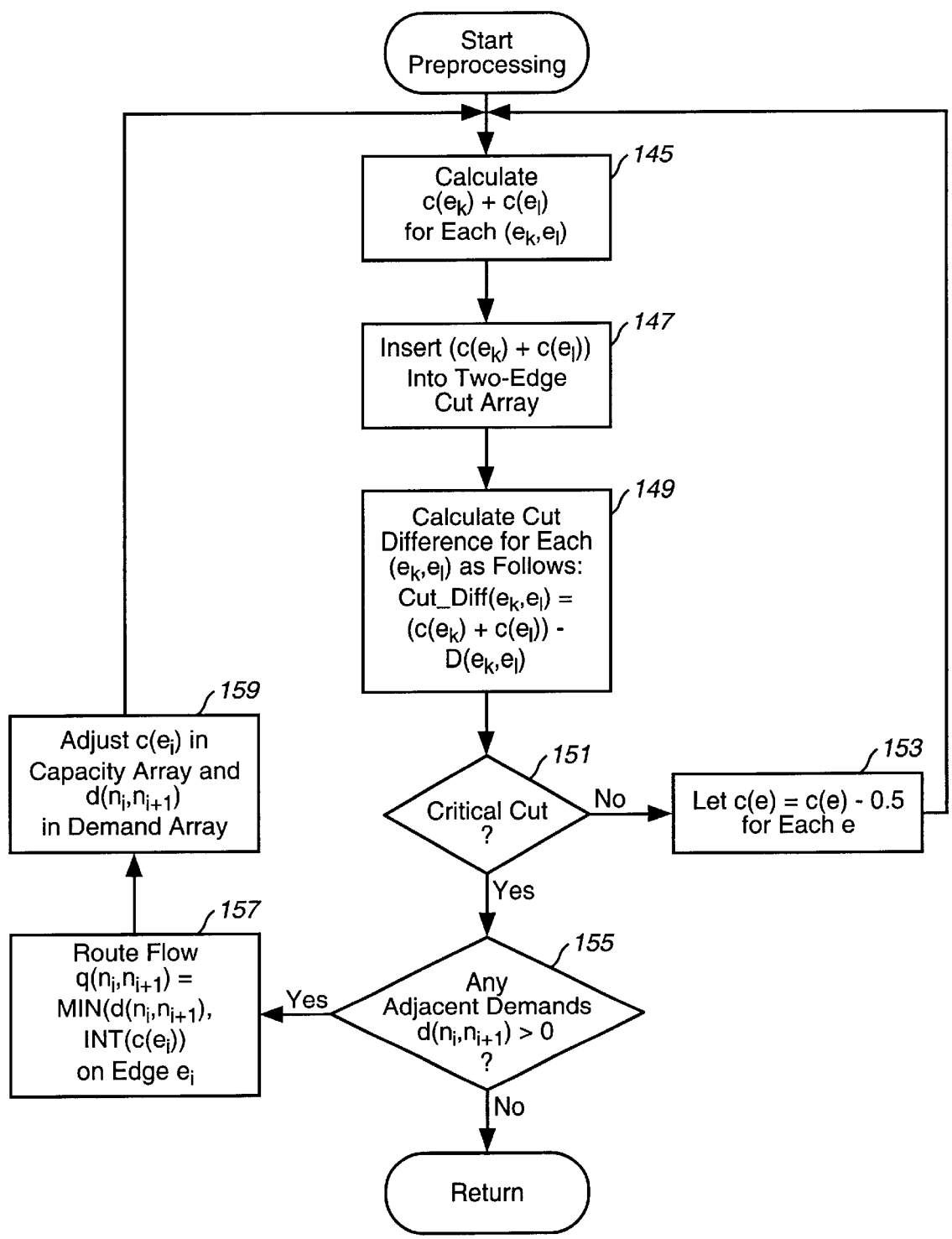
FIG. 7 is a flowchart of the preprocessing step of FIG. 6.
Figures 8, 9:
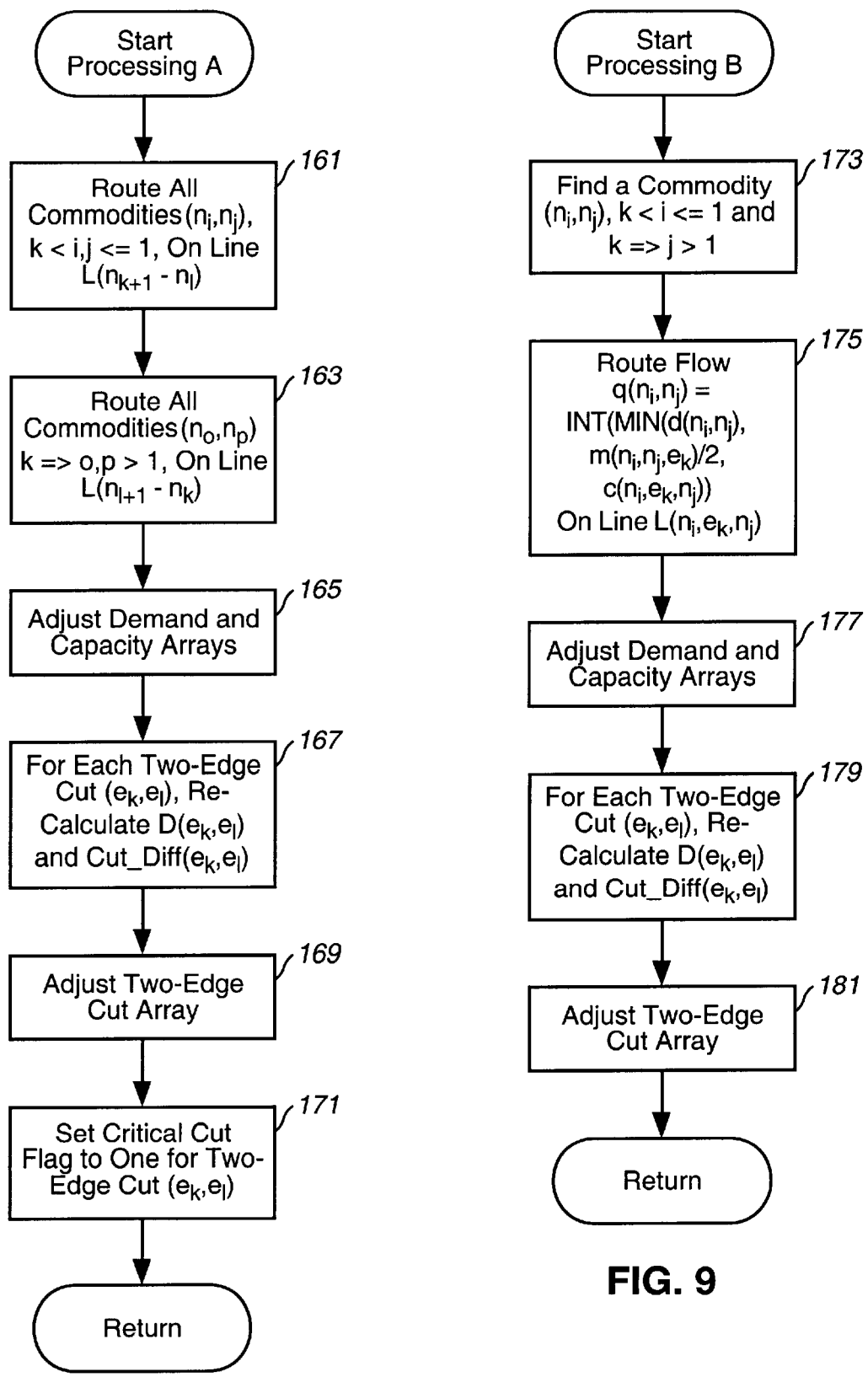
FIG. 8 is a flowchart of the processing step A of FIG. 6.
FIG. 9 is a flowchart of the processing step B of FIG. 6.

Referring again to FIG. 6, if there is a critical cut $(e_k, e_l)$ for which the flag is set to zero, then the flow routing method of the present invention performs a processing step A, as indicated generally at block 141, and shown in detail with respect to FIG. 8. If there is no critical cut for which the flag is set to zero, then the flow routing method of the present invention performs a processing step B, as indicated generally at block 143, and shown in detail with respect to FIG. 7. After performing processing steps A or B, processing returns to decision block 129 to test for the terminating conditions. Thus, the flow routing method of the present invention performs either processing step A at block 141, or processing step B at block 143, until the occurrence of a terminating condition.

Referring now to FIG. 7, there is shown preprocessing according to the flow routing method of the present invention. During preprocessing, the method calculates for each two-edge cut $(e_k, e_l)$ a capacity $c(e_k)$ plus $c(e_l)$, at block 145. The calculation of block 145 is done with reference to the capacity array of FIG. 14. Referring to FIG. 14, initially, the available capacity of each link is nineteen capacity units. Thus, the capacity for each pair of links is equal to thirty-eight capacity units. The preprocessing method of the present invention inserts the calculated capacity into the two-edge cut array of FIG. 13, at block 147. Preprocessing calculates the cut difference cut_diff$(e_k, e_l)$ for each two-edge cut $(e_k, e_l)$, at block 149. Referring to FIG. 13, the cut differences in cut difference column 91 range from one to nineteen.

Referring again to FIG. 7, preprocessing tests, at decision block 151, if there is a critical cut. If the capacity routing process of the present invention is performed following the capacity assignment process of the present invention, there will always be a critical cut. However, the flow routing process of the present invention may be performed with a preassigned set of capacities, not formed according to the capacity assignment method of the present invention. The flow routing method of the present invention requires at least one critical cut. Accordingly, if, at decision block 151, there is no critical cut then the method sets the capacity c(e) equal to c(e) minus 0.5 capacity units for each link e, at block 153 and returns to block 145. Processing loops through decision block 151 and process block 153 until there is a critical cut. Then, the preprocessing tests, at decision block 155, if there are any adjacent demands $D(n_i, n_{i+1})$ greater than zero. If so, preprocessing routes a flow $q(n_i, n_{i+1})$ equal to the minimum of the demand $D(n_i, n_{i+1})$ and the integer capacity $C(n_i, n_{i+1})$ on the edge $e_i$ connecting nodes $n_i$ and $n_{i+1}$, at block 157. Referring to FIG. 12, it will be noted that there is a demand greater than zero between each pair of adjacent nodes. Thus, during preprocessing, those demands are routed. When a demand is routed, the links column 83 of FIG. 12 is updated to show how the links are routed. Also, when a demand is routed, the method of the present invention adjusts the capacity $c(e_i)$ in the capacity array and the demand $D(n_i, n_{i+1})$ in the demand array, at block 159. Then, preprocessing returns to block 145. Preprocessing continues until, at decision block 155, there are no adjacent demands greater than zero.

Referring again to FIG. 6, after preprocessing of Block 127, the flow routing method of the present invention tests for the occurrence of a terminating condition at decision blocks 129–133. If there is no terminating condition, then the system tests at decision block 139 if there is any critical two-edge cut $(e_k, e_l)$ for which the flag of column 93 of FIG. 13 is set to zero. If so, the flow routing method of the present invention performs processing step A as indicated generally at block 141, and shown in detail with respect to FIG. 8. Referring to FIG. 8, in processing step A, the method of the present invention routes all commodities $(n_i, n_j)$ wherein both $n_i$ and $n_j$ are on one side of critical cut $(e_k, e_l)$ on the line formed by the nodes on that side of the critical cut. Computationally, the method routes all commodities $(n_i, n_j)$ wherein i and j are greater than k and equal to or less than l on the line $l(n_{k+1}, n_l)$, at block 161. Processing step A also routes all commodities $(n_o, n_p)$ on the other side of the critical cut on the line formed by the nodes on that side of the critical cut, at block 163. Computationally, processing step A routes all commodities $(n_o, n_p)$ wherein o and p are equal to or less than k and greater than l on the line l $(n_{l+1}, n_k)$. Then, processing adjusts the demand array of FIG. 12 by reducing the appropriate value in demand column 81 by the amount of flow routed and by inserting the appropriate links in links column 83, and adjusts the capacity array of FIG. 14 by reducing the available capacity in capacity column 97 for the link or links used in routing the demand, and updates the demand list of column 98, at block 165. Then, processing step A calculates for each two-edge cut ($e_k$, $e_l$), the demand D($e_k$, $e_l$), and the cut difference cut_diff($e_k$, $e_l$), at block 167, and adjusts the two-edge cut array of FIG. 13 accordingly, at block 169. Then, preprocessing step A sets the cut flag to one for two-edge cut ($e_k$, $e_l$) at block 171. When the flag is set to one, it indicates that processing step A does not need to be performed again with respect to that two-edge cut. After setting the critical cut flag, at block 171, processing returns to FIG. 6.

Referring again to FIG. 6, if, at decision block 139, there is no critical cut with a flag equal to zero, then the flow routing method of the present invention performs processing step B, as indicated generally at block 143 and shown in detail with respect to FIG. 9. Referring to FIG. 9, processing step B finds a commodity or demand ($n_i$, $n_j$) greater than zero for which i is greater than k and equal to or less than l and for which j is less than or equal to k and greater than l, at block 173. Thus, at block 173, processing step B finds a demand to be routed between a pair of nodes on opposite sides of a critical cut. Then, at block 175, processing step B routes a flow q($n_i$, $n_j$) on a line L($n_i$, $n_k$, $n_j$). Flow q($n_i$, $n_j$) is equal to the minimum of:

(i) the minimum demand d($n_i$, $n_j$) between nodes $n_i$ and $n_j$;

(ii) a quantity m($n_i$, $n_j$, $e_k$) divided by two (m($n_i$, $n_j$, $e_k$) is the minimum cut difference of all two-edge cuts with both edges on line L($n_i$, $n_k$, $n_j$); and, (iii) a capacity c($n_i$, $e_k$, $n_j$), which is the minimum capacity among the edges on the line L($n_i$, $e_k$, $n_j$). Preferably, line L($n_i$, $n_k$, $n_j$) is selected to have the fewest number of nodes. After routing flow q($n_i$, $n_j$) at block 175, processing step B adjusts the demand array of FIG. 12 and the capacity array of FIG. 14, at block 177. Then, processing step B calculates for each two-edge cut ($e_k$, $e_l$) the demand D ($e_k$, $e_l$) and the cut difference cut_diff ($e_k$, $e_l$), at block 179. Then, processing step B adjusts the two-edge cut array of FIG. 13, at block 181 and returns to FIG. 6 processing.

Referring again to FIG. 6, the flow routing method of the present invention performs either processing step A or processing step B until the occurrence of a terminating condition. If, at decision block 129, there are no demands left to be routed, then processing stops. If, at decision block 131, any capacity c(e) is equal to zero or 0.5, then the flow routing method of the present invention performs terminating processing step A, as indicated at block 135 and shown in detail with respect to FIG. 8.

Referring to FIG. 10, terminating step A tests, at decision block 183, if the capacity c($e_k$) that is equal to 0.5. If not, terminating step A routes all remaining demands D($n_i$, $n_j$) on the line formed by deleting edge $e_k$, at block 185, and returns to FIG. 6 processing where processing ends. If, at decision block 183, capacity c($e_k$) is equal to 0.5, then terminating step A adds 0.5 capacity units to each edge e, at block 187 and routes one unit of demand of D($n_i$, $n_j$) on line L($n_i$, $e_k$, $n_j$), at block 189. After routing one unit of demand at block 113, processing continues at block 185 and terminating step A routes all remaining demands on the line formed by deleting edge $e_k$.

Figure 11:
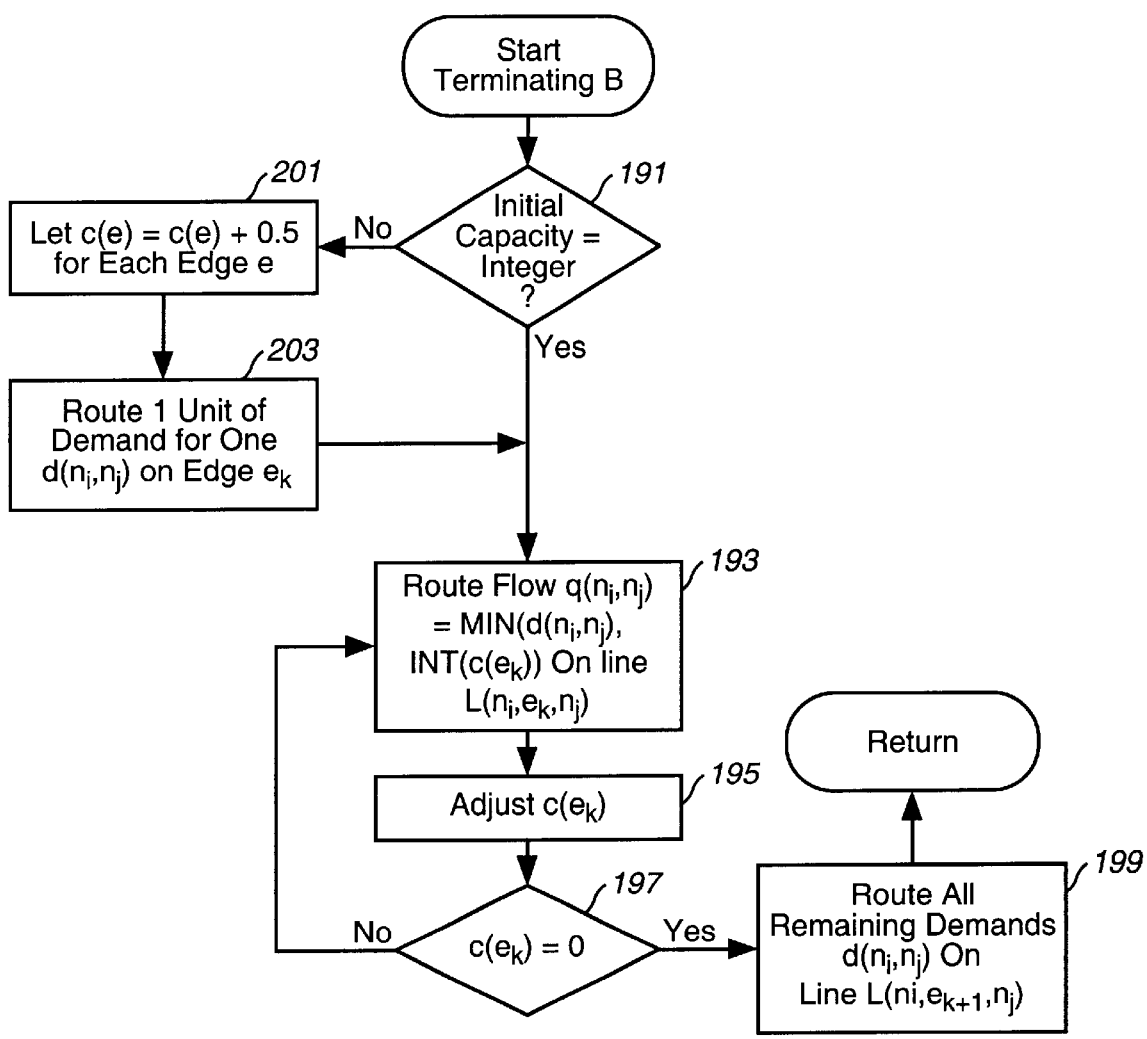
FIG. 11 is a flowchart of the terminating step B of FIG. 6.

Referring again to FIG. 6, if, at decision block 133, any adjacent two-edge cut D($e_k$, $e_{k+1}$) is critical, then the flow routing method of the present invention performs terminating step B, as indicated generally at block 137 and shown in detail with respect to FIG. 11. Referring to FIG. 11, terminating step B tests, at decision block 191 if the initial capacity of edges e is equal to an integer. In the present invention, the initial capacity is always either an integer value or a integer value plus 0.5 capacity units. If, at decision block 191, the initial capacity is an integer, then terminating step B routes a flow q($n_i$, $n_j$) equal to the minimum of the demand D($n_i$, $n_j$), and the integer value of the capacity c($e_k$) on the line L($n_i$, $n_k$, $n_j$), at block 193. Terminating step B then adjusts the capacity c($e_k$) in the capacity array of FIG. 14, at block 195, and tests, at decision block 197 if capacity c($e_k$) is equal to zero. If not, processing returns to block 193 and terminating step B routes another flow on line L($n_i$, $e_k$, $n_j$), until the capacity of link $e_k$ is determined at decision block 197 to be equal to zero. Then, terminating step B routes all remaining demands D($n_i$, $n_j$) on the line L($n_i$, $e_{k+1}$, $n_j$), at block 199 and returns to FIG. 6 processing where processing ends.

If, at decision block 191 the initial capacity of the links of the ring is not an integer value, then terminating step B adds one-half capacity unit to each edge e, at block 201, and routes one unit of demand D($n_i$, $n_j$) on link $e_k$, at block 203. Then, processing continues at block 193.

From the foregoing, it may be seen that the present invention provides an efficient method and system for reconfiguring a ring in real time without disrupting traffic carried by the ring. As the ring becomes unbalanced due to provisioning and deprovisioning circuits, the method of the present invention allows the ring to be reconfigured dynamically so as to maintain optimally balanced demand loading. The method of the present invention also allows the network to be dynamically reconfigured in real time by changing the inter-ring routing plan. The system calculates an optimally balanced demand loading based upon the new inter-ring routing plan and generates secondary time slot assignment maps for the ADMs of the affected rings. The ADMs of the affected rings flash cut to the secondary TSAs and the DXCs switch the inter-ring connections substantially simultaneously, thereby implementing the new inter-ring routing plan.

What is claimed is:

1. A method of managing a SONET ring, which comprises the steps of:

(a) computing an optimally balanced demand loading for said SONET ring, wherein each link of said SONET ring carries substantially the same demand as every other link of said SONET ring;

(b) generating an updated time slot assignment map for each node of said SONET ring based upon said optimally balanced demand loading; and, (c) causing each node of said SONET ring to switch substantially simultaneously to said updated time slot assignment map generated for said each node.

2. The method as claimed in claim 1, including the step of: freezing provisioning activity on said SONET ring during the performance of steps (a)–(c).

3. The method as claimed in claim 1, including the step of performing steps (a)–(c) periodically.

4. The method as claimed in claim 3, including the step of performing steps (a)–(c) quarterly.

5. The method as claimed in claim 1, wherein said step of causing each node of said SONET ring to switch substantially simultaneously to said updated time slot assignment map generated for said each node includes the step of:

downloading to each node of said SONET ring the updated time slot assignment map generated for said each node.

6. The method as claimed in claim 5, wherein said step of causing each node of said SONET ring to switch substantially simultaneously to said updated time slot assignment map generated for said each node includes the step of:

sending to said each node a time to switch to said downloaded updated time slot assignment map.

7. The method as claimed in 1, including the step of determining if any element of said SONET ring is in protection mode prior to performing step (c).

8. The method as claimed in claim 1, wherein said step of computing an optimally balanced demand loading for said SONET ring includes the steps of:

(d) defining for each pair of links of said SONET ring a two-edge cut, each two-edge cut dividing said ring into a first set of nodes on one side of said two-edge cut and a second set of nodes on the other side of said two-edge cut;

(e) calculating, for each two-edge cut, the sum of demands between the nodes of said first set and the nodes of said second set;

(f) calculating, for each two-edge cut, the sum of the capacities of the links of said each two-edge cut;

(g) calculating, for each two-edge cut, a cut difference equal to the difference between the sum of the capacities of the links of said each two-edge cut and the sum of demands between the nodes of said first set and the nodes of said second set;

(h) if any two-edge cut has a cut difference equal to or less than one and a demand greater than zero between nodes of said first set or a demand greater than zero between nodes of said second set, routing the demands between nodes of said first set on a line formed by the nodes of said first set and routing the demands between nodes of a second set on a line formed by the nodes of said second set;

(i) if any two-edge cut has a cut difference equal to or less than one and no demand greater than zero between nodes of said first set and no demand greater than zero between nodes of said second set, routing a portion of the demand between a selected node of said first set and a selected node of said second set on a line formed by the selected node of said first set and the selected node of said second set; and repeating steps (e) through (i) until a terminating condition occurs.

9. The method as claimed in claim 8, wherein said demand portion of the demand between a selected node of said first set and a selected node of said second set is equal to the minimum of:

(i) the demand between said selected node of said first set and said selected node of said second set;

(ii) the minimum capacity of a link on said line formed by the selected node of said first set and the selected node of said second set; and, (iii) one-half the capacity of any adjacent two-edge cut on said line formed by the selected node of said first set and the selected node of said second set.

10. The method as claimed in claim 8, wherein a terminating condition occurs whenever the demand between each pair of nodes of said rings is equal to zero.

11. The method as claimed in claim 8, wherein a terminating condition occurs whenever the capacity of any link of said ring is less than one.

12. The method as claimed in claim 8, wherein any adjacent two-edge cut has a cut difference equal to or less than one.

13. The method as claimed in claim 8, wherein the line formed by the selected node of said first set and the selected node of said second set is the line between the selected node of said first set and the selected node of said second set with the fewest number of nodes.

14. A system for managing a SONET ring, which comprises:

means for computing an optimally balanced demand loading for said SONET ring wherein each link of said SONET ring carries substantially the same demand as every other link of said SONET ring;

means for generating an updated time slot assignment map for each node of said SONET ring based upon said optimally balanced demand loading; and, means for causing each node of said SONET ring to switch substantially simultaneously to said updated time slot assignment map generated for said each node.

15. The system as claimed in claim 14, including: means for freezing provisioning activity on said SONET ring.

16. The system as claimed in claim 14, wherein means for causing each node of said SONET ring to switch substantially simultaneously to said updated time slot assignment map generated for said each node includes:

means for downloading to each node of said SONET ring the updated time slot assignment map generated for said each node.

17. The system as claimed in claim 16, wherein means for causing each node of said SONET ring to switch substantially simultaneously to said updated time slot assignment map generated for said each node includes:

means for sending to said each node a time to switch to said downloaded updated time slot assignment map.

18. A SONET ring system, which comprises:

a plurality of nodes interconnected by links in a ring topology, each of said nodes including means for storing an active time slot assignment map and a secondary time slot assignment map, and each of said nodes including means for substituting a secondary time slot assignment map for an active time slot allocation map at a designated time; and, a ring management system in communication with each node of said SONET ring, said ring management system including:

means for computing an optimally balanced demand loading for said SONET ring;

means for generating a secondary time slot assignment map for each node of said SONET ring based upon said optimally balanced demand loading; and, means for downloading to each node of said SONET ring a secondary time slot assignment map generated for said each node and a designated time for said each node to swap substitute said downloaded secondary time slot assignment map.

19. The system as claimed in claim 18, wherein said ring management system includes:

means for freezing provisioning activity on said SONET ring.

20. The system as claimed in claim 18, wherein said means for computing an optimally balanced demand loading for said SONET ring includes means for computing a demand loading for said SONET ring wherein each link of said SONET ring carries substantially the same demand as every other link of said SONET ring.

* * * * *